US012404997B2

(12) United States Patent
Zhang

(10) Patent No.: US 12,404,997 B2
(45) Date of Patent: Sep. 2, 2025

(54) CONNECTION DEVICE OF POWER SUPPLIES OF MAIN ROD OF SIMULATED CHRISTMAS TREE

(71) Applicant: Yabin Zhang, Zixing (CN)

(72) Inventor: Yabin Zhang, Zixing (CN)

( * ) Notice: Subject to any disclaimer, the term of this patent is extended or adjusted under 35 U.S.C. 154(b) by 258 days.

(21) Appl. No.: 18/300,848

(22) Filed: Apr. 14, 2023

(65) Prior Publication Data

US 2024/0344689 A1 Oct. 17, 2024

(51) Int. Cl.

*F21V 23/06* (2006.01)
*F21V 23/00* (2015.01)
*H01R 13/73* (2006.01)
*F21W 121/04* (2006.01)

(52) U.S. Cl.

CPC ............ *F21V 23/06* (2013.01); *F21V 23/001* (2013.01); *F21W 2121/04* (2013.01); *H01R 13/73* (2013.01)

(58) Field of Classification Search

CPC ............ A47G 33/06; A47G 2033/0827; A47G 2033/0836; F21V 33/001; F21V 23/06; F21W 2121/04; H01R 13/73

See application file for complete search history.

(56) References Cited

U.S. PATENT DOCUMENTS

| | | | | |
|---|---|---|---|---|
| 10,085,504 B2 * | 10/2018 | Chen | .................... | H01R 13/502 |
| 2013/0301246 A1 * | 11/2013 | Chen | ........................ | F21V 23/02 362/123 |
| 2020/0022521 A1 * | 1/2020 | Loomis | ................ | H05B 47/155 |

OTHER PUBLICATIONS

Innovation Q+ NPL Search (Year: 2024).*

* cited by examiner

*Primary Examiner* — Anabel Ton

(57) ABSTRACT

A connection device includes: an upper section and a lower section. A plurality of branches are arranged between the upper section and the lower section. A plurality of threaded holes are arranged between the plurality of branches. An upper power line is arranged inside the upper section, a lower power line is arranged inside the lower section. An upper section sleeve and a lower section sleeve are arranged at a connection between the upper section and the lower section. The upper section sleeve sleeves a power connector male plug, and the lower section sleeve sleeves a power connector female plug. The upper power line is connected the power connector male plug, and the lower power line is connected to the power connector female plug. The power connector male plug has a hollow rod, the power connector female plug has a hollow connecting rod connected with the hollow rod.

8 Claims, 2 Drawing Sheets

CONNECTION DEVICE OF POWER SUPPLIES OF MAIN ROD OF SIMULATED CHRISTMAS TREE

TECHNICAL FIELD

The present disclosure relates to the field of processing ornamental products, and in particular to a connection device of power supplies of a main rod of a simulated Christmas tree.

BACKGROUND

It may be more convenient to use the connection device of power supplies of a main section of a simulated Christmas tree than a real plant. However, some problems may occur the connection device is in use. For example, a light string is hung on a branch of the connection device of power supplies of the main section of the simulated Christmas tree, lines may wind to form knots easily. Further, when lines of the device are connected, lines of the entire device may not be effectively protected, such that lines of the device may be broken at a position where lines are connected with each other, and short circuits and other problems may also occur, causing safety hazards.

SUMMARY OF THE DISCLOSURE

The present disclosure provides a connection device of power supplies of a main section of a simulated Christmas tree, lines of the device may not be easily wind and knotted, a short circuit may be prevented, and lines of the entire device may be protected. An upper section and a lower section of the Christmas tree are aligned and connected with each other, and a power supply connection device is received in a hollow tube, such that the Christmas tree can be electrically connected even when the Christmas tree is rotated 360°.

According to an aspect, the present disclosure provides a connection device of power supplies in a main rod of a simulated Christmas tree, including: an upper section of the main rod and a lower section of the main rod, or including at least two connecting sections.

A plurality of branches are arranged between the upper section and the lower section, a plurality of threaded holes are arranged between the plurality of branches, an upper power line is arranged inside the upper section, a lower power line is arranged inside the lower section, an upper section sleeve and a lower section sleeve are arranged at a connection between the upper section and the lower section, the upper section sleeve sleeves a power connector male plug, and the lower section sleeve sleeves a power connector female plug.

The upper power line is connected the power connector male plug, and the lower power line is connected to the power connector female plug. The power connector male plug is arranged with a hollow rod, the power connector female plug is arranged with a hollow connecting rod connected with the hollow rod. The upper power line is conductively connected with the lower power line via the power connector male plug and the power connector female plug.

Each of the upper power line and the lower power line is connected to a threaded male plug and a threaded female plug via at least one of the plurality of threaded holes, each of the threaded male plug and the threaded female plug is connected to a light string hung on at least one of the plurality of branches.

In the above embodiments, lines of the connection device are hidden in the upper section and the lower section and protected. The power line between the threaded hole and the light string are connected to the threaded male and female plugs. In this way, lines of the connection device are hidden and protected, preventing short circuits, and the lines may not affect the outer appearance of the Christmas tree, and the lines may not wind to form knots.

In some embodiments, a bottom of the power connector male plug is the hollow rod; a top of the power connector female plug is the hollow connecting rod connected to the hollow rod; and each of the power connector male plug and the power connector female plug is arranged with assembly interfaces of a positive electrode and a negative electrode of a power supply.

In some embodiments, the hollow rod is arranged with a power line fixing fastener.

In some embodiments, the lower power line is connected to a power plug, and the power plug is connected to an external power supply.

In some embodiments, each of the upper section sleeve and the lower section sleeve is arranged with a lead portion for inputting the power line, a line connection portion connected to the power line, and a connector portion for connecting the upper power line with the lower power line, sequentially.

In some embodiments, the power connector male plug is received in an inner cavity of the connector portion of the upper section sleeve, and the power connector female plug is received in an inner cavity of the connector portion of the lower section sleeve.

In some embodiments, each of the upper section sleeve and the lower section sleeve has a disassembly port.

In some embodiments, a top of the upper section sleeve is arranged with a positioning point of fixing elastic sheet, a top of the lower section sleeve is arranged with another positioning point of fixing elastic sheet; the hollow upper section defines a positioning hole corresponding to the positioning point of fixing elastic sheet of the upper section sleeve, the hollow lower section defines another positioning hole corresponding to the another positioning point of fixing elastic sheet of the lower section sleeve; and a middle-upper portion of each of the upper section sleeve and the lower section sleeve is arranged with a fixing elastic inverted snap.

The present disclosure provides the following technical effects:

1. In the present disclosure, the hollow rod is connected to the hollow connecting rod, allowing the male plug of the power connector and the female plug of the power connector to be connected easily, and the metal conductivity is better. The power line fixing fastener may fix the power line that protrudes from the hollow rod of the main rod, such that power lines may not be loose or scattered. The power plug is connected to the external power supply for conduction.
2. The positive electrode and the negative electrode power lines are fixed by screws at the assembly interfaces of the positive electrode and the negative electrode of the power supply, respectively. The disassembly port allows screws of the positive electrode and the negative electrode at the male/female plugs to be disassembled and assembled easily. The fastening point of the positioning elastic sheet is fastened with the positioning hole of the hollow rod of the main rod, enabling the male/female plugs to reach desired positions, such that positioning and fixing functions are achieved. The fixing elastic inverted fastener is the elastic inverted sheet arranged on the sleeve of the power supply connection device and is configured to allow the male or female plugs to be fixedly received in the cavity in the sleeve, such that the plugs may not be loose and may not fall off.

3. The sleeve of the power supply connection device may protect the power lines. The male and female plugs in the sleeve can connect the power lines in the upper section of the main rod with the power lines in the lower section of the main rod, achieving electrical connection. The lines of the connection device of the power supplies of the main rod of the simulated Christmas tree are buried in the upper and lower sections of the main rod. The power line between the threaded hole and the light string is connected with threaded male and threaded female plugs. In this way, the lines are hidden and are protected, the lines may not affect the outer appearance of the Christmas tree, and the lines may not wind to form knots, preventing short circuits.

Figure 1:
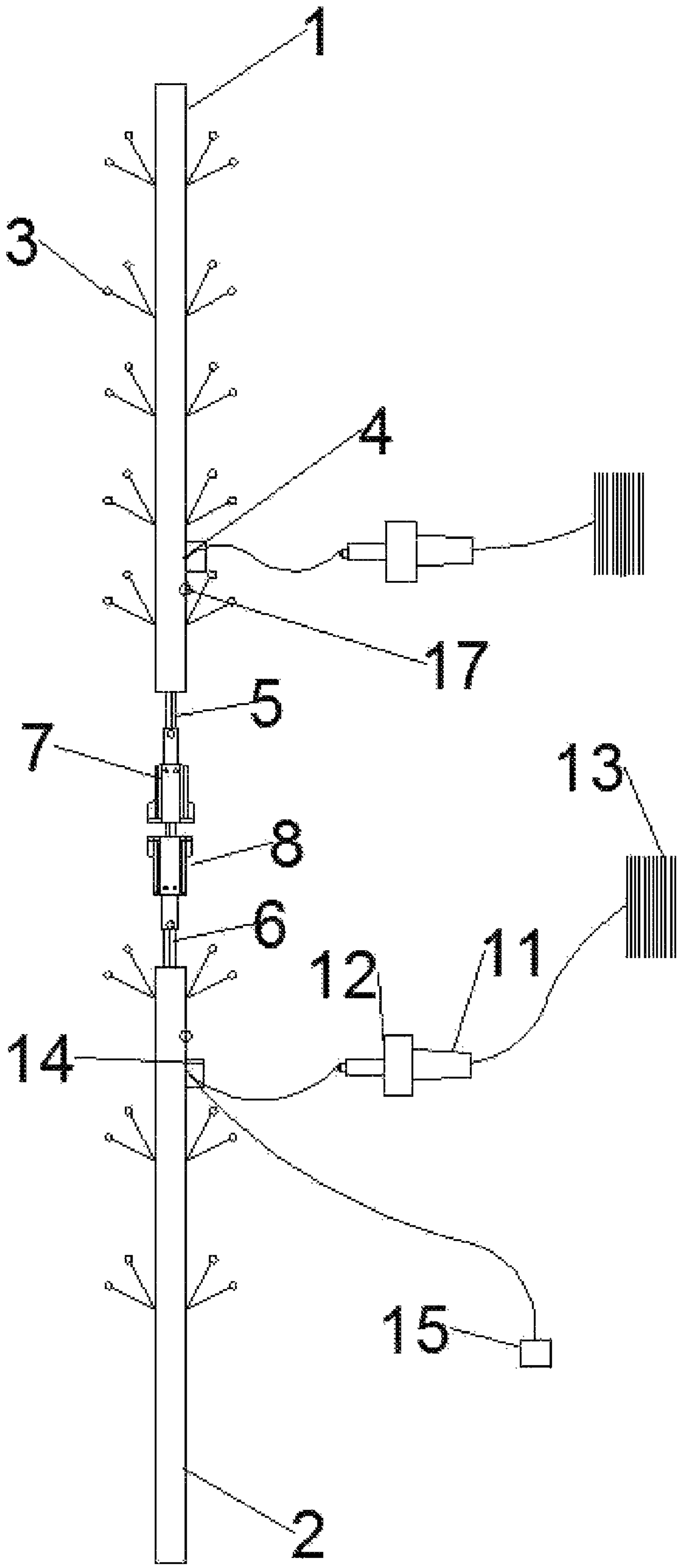
FIG. 1 is a perspective schematic view of a connection device of power supplies of main rods of a simulated Christmas tree according to embodiments of the present disclosure.

Reference numerals: 1. upper section of the main rod; 2. lower section of the main rod; 3. Branch; 4. threaded hole; 5. upper power line; 6. lower power line; 7. upper section sleeve; 8. lower section sleeve; 9. power connector male plug; 10 power connector female plug; 11. threaded male plug; 12. threaded female plug; 13. light string; 14. power line fixing fastener; 15. power plug; 16, lead portion; 17, positioning hole; 18, connector portion; 20, assembly interfaces of positive electrode and negative electrode; 21, disassembly port; 22, fastening point of the positioning elastic sheet; and 23, fixing elastic inverted snap.

DETAILED DESCRIPTION

In order to understand the above-mentioned objects, features and advantages of the present disclosure better, the present disclosure is further described below by referring to the accompanying drawings and embodiments. To be noted that the embodiments of the present disclosure and the features in the embodiments can be combined with each other, as long as no conflict is caused.

Various details are described in the following description in order to facilitate a full understanding of the present disclosure. However, the present disclosure may alternatively be implemented in other ways than those described herein. Therefore, the present disclosure is not limited to the specific embodiments in the following disclosure specification.

Figure 2:
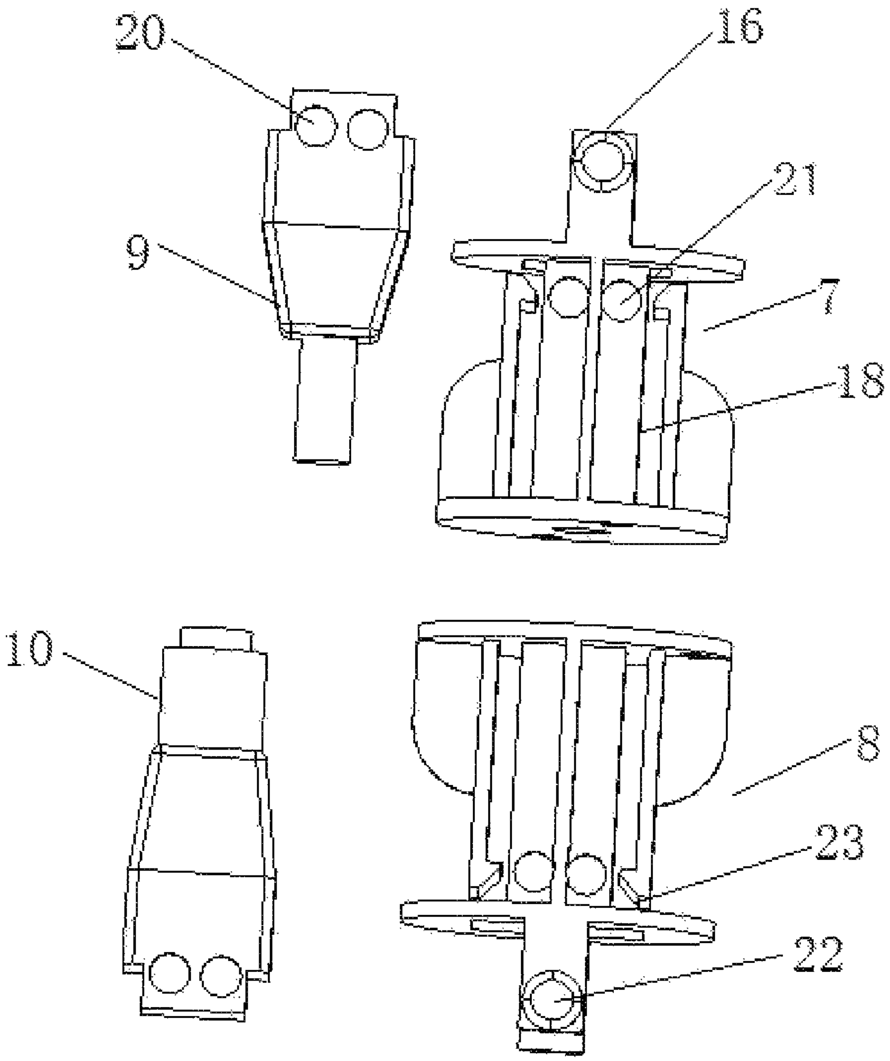
FIG. 2 is a structural schematic view of a sleeve of the upper section of the main rod and a sleeve of the lower section of the main rod being separated from the male plug and the female plug according to embodiments of the present disclosure.

As shown in FIGS. 1 and 2, the present disclosure provides a connection device of power supplies in a main rod of a simulated Christmas tree. The device includes an upper section 1 of the main rod and a lower section 2 of the main rod. A plurality of branches 3 are arranged between the upper section 1 and the lower section 2. A plurality of threaded holes 4 are arranged between the plurality of branches 3. An upper power line 5 is arranged inside the upper section 1, and a lower power line 6 is arranged inside the lower section 2. An upper section sleeve 7 and a lower section sleeve 8 are arranged at a connection point between the upper section 1 and the lower section 2. The upper section sleeve 7 sleeves a power connector male plug 9, and The lower section sleeve 8 sleeves a power connector female plug 10. The upper power line 5 is connected the power connector male plug 9, and the lower power line 6 is connected to the power connector female plug 10. A top of the power connector female plug 10 is a hollow rod. A bottom of the power connector male plug 9 is received in the hollow rod. The upper power line 5 and the lower power line 6 are connected with each other via the power connector male plug 9 and the power connector female plug 10. Each of the upper power line 5 and the lower power line 6 is connected to a threaded male plug 11 and a threaded female plug 12 via the threaded hole 4. The threaded male plug 11 and the threaded female plug 12 are connected to a light string 13 hung on the branches 3. The threaded hole 4 is arranged with a power line fixing fastener 14. The lower power line 6 is connected to a power plug 15. The power plug 15 is connected to an external power supply. Each of the upper section sleeve 7 and the lower section sleeve 8 is arranged with a lead portion 16 for inputting the power line, a line connection portion connected to the power line, and a connector portion 18 for connecting the upper power line with the lower power line, sequentially.

As shown in FIG. 1 and FIG. 2, light strings 13 are usually tied in bundles. When the light strings 13 are needed for decoration, the light strings 13 are configured into a certain shape or arranged regularly to be hung on various leaves of the branches 3 of the power supply connection device of the main rod of the simulated Christmas tree. Each of the upper section 1 and the lower section 2 defines one or more threaded holes 4. The upper section 1 is arranged with a plurality of branches, and the lower section 2 is arranged with a plurality of branches. A sub-line is extended from the power line at each threaded hole 4 and is connected to the threaded female plug 12 and the threaded male plug 11. The threaded female plug 12 and the threaded male plug 11 are connected to the light strings 13. Further, another sub-line is extended from the power line is extended from the power line at the threaded hole 4 of the lower section 2, and is connected to the power plug 15. The power plug 15 is connected to the external power source. The number of branches 3, the number of threaded holes 4, and the number of power lines can be determined based on demands. The power plug 15 can be connected to the power line of the upper section or the power line of the lower section.

In the present disclosure, firstly, the power line is fixed by screws at the assembly interfaces 20 of positive electrode and the negative electrode of the power supply. The power connector male plug and the power connector female plug are received into the sleeves of the connection device. Further, the sleeves of the connection device are received into the main rod. The power connector male plug 9 and power connector female plug 10 received in the inner cavity of the sleeves of the connection device may be prevented from loosening and falling off by a fixing elastic inverted snap 23. At last, a positioning point of a fixing elastic sheet 22 is fastened with the positioning hole 17 on the main rod. In this way, assembling the connection device is completed. Positive electrode power lines and negative electrode power lines are fixed at the assembly interfaces 20 of the positive electrode and the negative electrode by screws. The disassembly port 21 is arranged to allow the screws at the power connector male plug and the power connector female plug to be disassembled and assembled easily. Fastening the positioning point of the fixing elastic sheet 22 with the positioning hole 17 of the main rod allows the power connector male plug and the power connector female plug to be arranged at desired positions, and the power connector male plug and the power connector female plug can be fixed. The fixing elastic inverted snap 23 is an elastic inverted snap arranged on the sleeves of the connection device and is configured to allow the power connector male plug 9 or the power connector female plug 10 to be fixedly received in the inner cavity of the sleeves of the connection device, preventing the power connector male plug 9 or the power connector female plug 10 from being loose and falling off.

To summarize, in the present disclosure, the sleeves of the of the connection device protect the power lines. The power connector male plug and the power connector female plug in the sleeves can connect the power line in the upper section of the main rod with the power line in the lower section of the main rod, achieving electric connection. The lines of the power supply connection device of the main rod of the simulated Christmas tree are buried by the upper and lower sections of the main rod. The lines extend along the upper and lower sections. The power lines between the threaded hole and the light string are connected with the threaded male plug and the threaded female plug. In this way, lines are hidden and protected, the lines may not affect the outer appearance of the Christmas tree, and the lines may not wind to form knots, preventing short circuits. After the upper section and the lower section of the Christmas tree are aligned and connected with each other, the power supply connection device is received in the hollow tube, such that the Christmas tree can be electrically connected even when the Christmas tree is rotated 360°.

The above description shows only preferred embodiments of the present disclosure and is not intended to limit the present disclosure. Any ordinary skilled person in the art may change or adapt the technical features disclosed above to obtain equivalent embodiments to be applied in other fields. However, any simple modifications, equivalent changes and adaptations made to the above embodiments without departing from the concept of the technical solutions of the present disclosure shall fall within the scope of the present disclosure.

What is claimed is:

1. A connection device of power supplies in a main rod of a simulated Christmas tree, comprising: an upper section of the main rod and a lower section of the main rod, wherein, a plurality of branches are arranged between the upper section and the lower section, a plurality of threaded holes are arranged between the plurality of branches, an upper power line is arranged inside the upper section, a lower power line is arranged inside the lower section, an upper section sleeve and a lower section sleeve are arranged at a connection between the upper section and the lower section, the upper section sleeve detachably sleeves a power connector male plug, and the lower section sleeve detachably sleeves a power connector female plug; the upper section sleeve has a same structure as the lower section sleeve;

the upper power line is connected the power connector male plug, and the lower power line is connected to the power connector female plug, the power connector male plug is arranged with a metal conductive rod, the power connector female plug is arranged with a hollow metal conductive rod connected with the metal conductive rod, the upper power line is conductively connected with the lower power line via the power connector male plug and the power connector female plug.

2. The connection device according to claim 1, wherein a bottom of the power connector male plug is the metal conductive rod; a top of the power connector female plug is the hollow metal conductive rod connected to the metal conductive rod; and each of the power connector male plug and the power connector female plug is arranged with assembly interfaces of a positive electrode and a negative electrode of a power supply.

3. The connection device according to claim 1, wherein the lower power line is connected to a power plug, and the power plug is connected to an external power supply.

4. The connection device according to claim 1, wherein each of the upper section sleeve and the lower section sleeve is arranged with a lead portion for inputting the power line, a line connection portion connected to the power line, and a connector portion for connecting the upper power line with the lower power line, sequentially.

5. The connection device according to claim 4, wherein the power connector male plug is received in an inner cavity of the connector portion of the upper section sleeve, and the power connector female plug is received in an inner cavity of the connector portion of the lower section sleeve.

6. The connection device according to claim 1, wherein each of the upper section sleeve and the lower section sleeve has a disassembly port.

7. The connection device according to claim 1, wherein a top of the upper section sleeve is arranged with a positioning point of fixing elastic sheet, a top of the lower section sleeve is arranged with another positioning point of fixing elastic sheet; the hollow upper section defines a positioning hole corresponding to the positioning point of fixing elastic sheet of the upper section sleeve, the hollow lower section defines another positioning hole corresponding to the another positioning point of fixing elastic sheet of the lower section sleeve; and the positioning point of fixing elastic sheet of the upper section sleeve is fastened with the positioning hole of the hollow upper section, the positioning point of fixing elastic sheet of the lower section sleeve is fastened with the positioning hole of the hollow lower section.

8. The connection device according to claim 1, wherein the upper section sleeve is provided with a fixing elastic inverted snap configured to allow the power connector male plug to be fixedly received in an inner cavity of the upper section sleeve and prevent the power connector male plug from being loose and falling off; the lower section sleeve is provided with another fixing elastic inverted snap configured to allow the power connector female plug to be fixedly received in an inner cavity of the lower section sleeve and prevent the power connector female plug from being loose and falling off.

* * * * *